US005201983A

United States Patent [19]

Corey

[11] Patent Number: 5,201,983

[45] Date of Patent: Apr. 13, 1993

[54] APPARATUS FOR FABRICATING A FIVE-PIECE EXPANDING POCKET

[76] Inventor: Thomas J. Corey, 481 Delaware Ave., Buffalo, N.Y. 14202

[21] Appl. No.: 805,310

[22] Filed: Dec. 10, 1991

[51] Int. Cl.[5] .......................... B32B 31/04; B31F 5/04

[52] U.S. Cl. .................................... 156/539; 156/559; 156/560; 156/561; 156/562; 156/227

[58] Field of Search ............... 156/539, 559, 560, 561, 156/562, 227, 216, 299, 308.4, 60; 493/210, 220, 264, 244, 334, 918, 940, 947; 229/72, DIG. 3; 383/120

[56] References Cited

U.S. PATENT DOCUMENTS

| | | | |
|---|---|---|---|
| 1,455,419 | 5/1923 | Ahlquist | 229/72 X |
| 1,734,642 | 11/1929 | Olm | 229/72 X |
| 1,968,165 | 7/1934 | Olm . | |
| 3,434,400 | 3/1969 | Hochfeld | 493/918 X |
| 4,401,257 | 8/1983 | Benham | 229/72 |
| 4,425,111 | 1/1984 | Chazelas | 493/918 |

*Primary Examiner*—Michael W. Ball
*Assistant Examiner*—Michele K. Yoder
*Attorney, Agent, or Firm*—Joseph P. Gastel

[57] ABSTRACT

A five-piece expanding pocket having front inner and outer panels secured to each other by cohesive glue, rear inner and outer panels secured thereof by cohesive glue, and a gusset having outer edge portions with cohesive glue on opposite sides thereof bonded between edge portions of the front and rear inner and outer panels which are bonded to each other. A fixture for assembling a five-piece expanding pocket including locating plates for retaining front and rear inner panels in a predetermined position, a positioning member for locating a gusset relative to the front and rear inner panels on the locating plates and permitting the gusset to be secured to cohesive glue on the front and rear inner panels, and the locating plates also permitting the locating of the front and rear outer panels relative to the front and rear inner panels, respectively. A method of assembling a five-piece pocket by positioning front and rear inner panels with cohesive glue on the outer surfaces thereof, bonding a gusset to the outer surfaces of the front and rear inner panels by cohesive glue on outer edge portions of the gusset, and bonding front and rear outer panels to the front and rear inner panels by cohesive glue on inner surfaces of the front and rear outer panels with the edge portions of the gusset sandwiched between the inner and outer front panels and between the inner and outer rear panels.

17 Claims, 4 Drawing Sheets

Fig. 1.
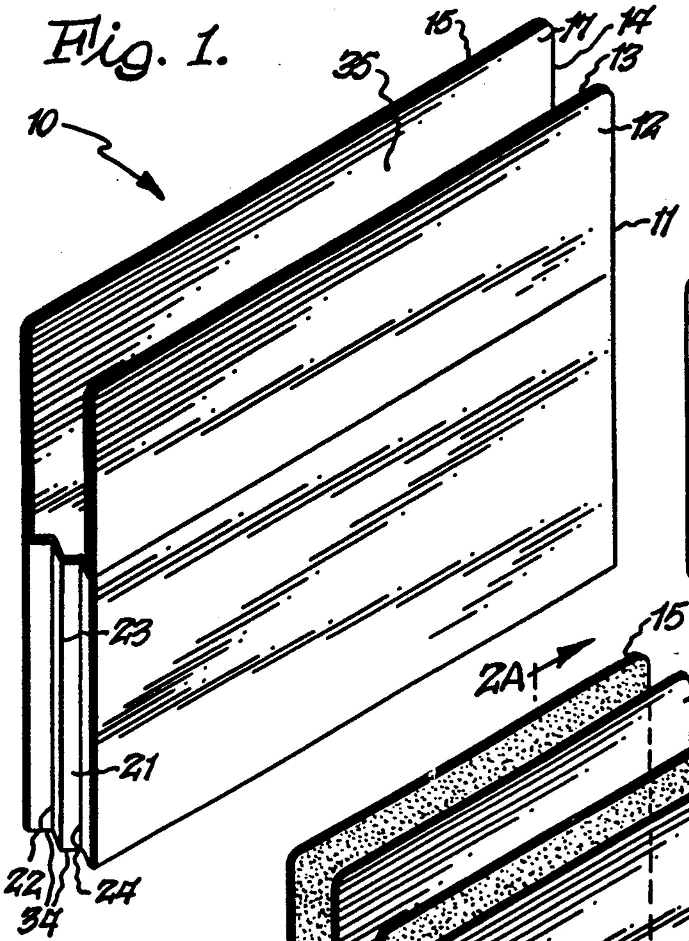
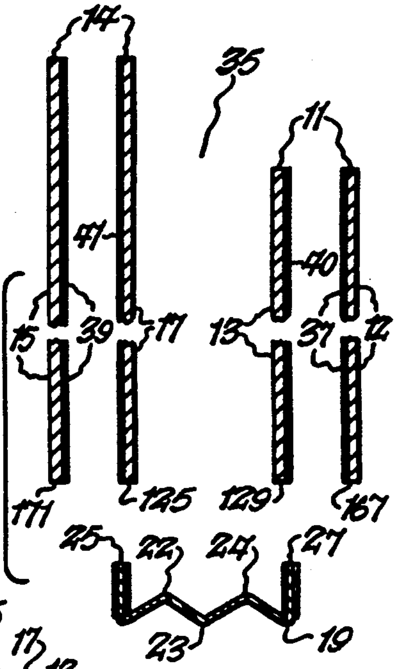
Fig. 2A.
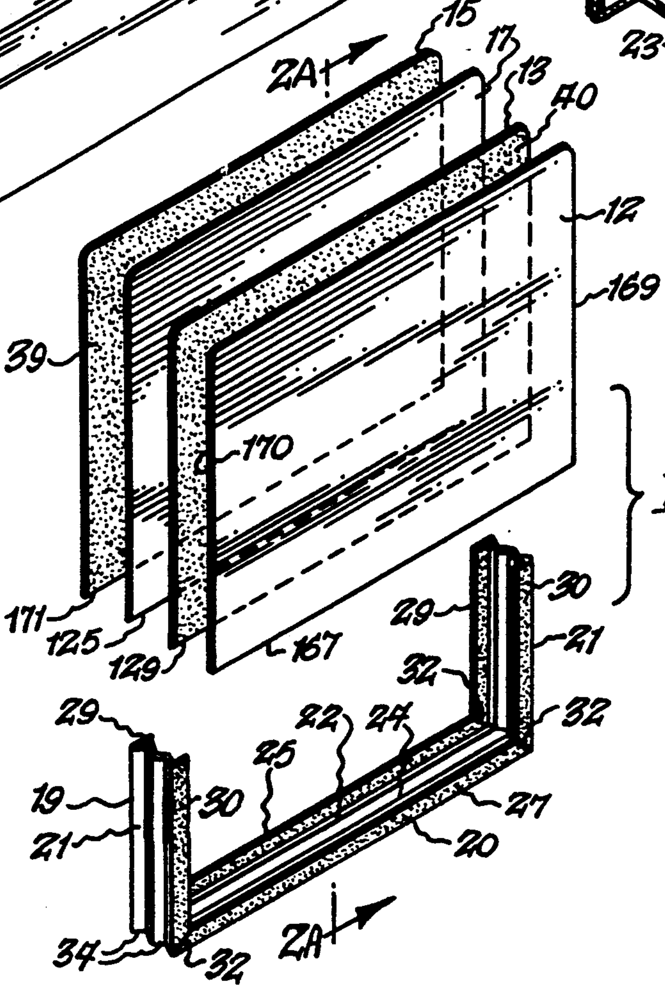
Fig. 2.

APPARATUS FOR FABRICATING A FIVE-PIECE EXPANDING POCKET

BACKGROUND OF THE INVENTION

The present invention relates to an improved five-piece expanding pocket, and to a fixture and method for permitting the assembly thereof by blind people.

By way of background, a stationery item commonly known as a five-piece expanding pocket consists of a front side connected to a rear side by a gusset which extends along the bottom and partially along the sides. In the past, pockets of this type were assembled by the use of ordinary glue and by hand without the benefit of a fixture. Blind people could not assemble the foregoing type of pocket efficiently.

SUMMARY OF THE INVENTION

It is one object of the present invention to provide an improved five-piece expanding pocket which can be fabricated by totally blind personnel.

Another object of the present invention is to provide a fixture which enables totally blind personnel to assemble a five-piece expanding pocket.

A further object of the present invention is to provide an improved method for assembling five-piece expanding pockets. Other objects and attendant advantages of the present invention will readily be perceived hereafter.

The present invention relates to a five-piece expanding pocket comprising front inner and outer panels secured to each other by cohesive glue on first facing surfaces thereof, first outer edge portions on said front inner and outer panels, rear inner and outer panels secured to each other by cohesive glue on second facing surfaces thereof, second outer edge portions on said rear inner and outer panels, a gusset having third outer edge portions on one edge thereof and fourth outer edge portions on the opposite edge thereof, cohesive glue on opposite sides of all of said third and fourth outer edge portions, said third outer edge portions being bonded between said first outer edge portions of said front inner and outer panels which are secured to each other by cohesive glue on said first facing surfaces thereof, and said fourth outer edge portions being bonded between said second outer edge portions of said rear inner and outer panels which are secured to each other by cohesive glue on said second facing surfaces thereof.

The present invention also relates to a fixture for assembling a five-piece pocket comprising a base, first support means on said base for supporting a stack of front inner panels, second support means on said base for supporting a stack of rear inner panels, third support means on said base for supporting a stack of front outer panels, fourth support means on said base for supporting a stack of rear outer panels, a first locating plate mounted on said base, a second locating plate mounted on said base, moving means on said base for moving said first and second locating plates together and apart, and gusset-locating means on said base for locating a gusset relative to said first and second locating plates.

The present invention also relates to a method of fabricating a five-piece expanding pocket comprising the steps of cutting front and rear inner panels to size with each of said front and rear inner panels having a bottom edge and side edges, cutting front and rear outer panels to size, cutting and scoring a gusset having a central portion and outer end portions, applying cohesive glue to both sides of opposite edge portions of said gusset, applying cohesive glue to outer sides of said front and rear inner panels, applying cohesive glue to inner sides of said front and rear outer panels, aligning said front and rear inner panels with said outer sides thereof facing away from each other, pressing said edge portions of said central portion of said gusset against said outer sides of said front and rear inner panels along said bottom edges thereof, bending said outer end portions of said gusset relative to said central portion so as to cause them to lie along said side edges, pressing said edge portions of said outer end portions of said gusset against said outer sides of said front and rear inner panels along said side edges thereof, aligning said outer front and rear panels with said inner front and rear panels, respectively, and pressing said inner sides of said outer front and rear panels against said outer sides of said inner front and rear panels, respectively, to form a completed five-piece expanding pocket.

The various aspects of the present invention will be more fully understood when the following portions of the specification are read in conjunction with the accompanying drawings wherein:

BRIEF DESCRIPTION OF THE DRAWINGS

FIG. 1 is a perspective view of the five-piece expanding pocket of the present invention;

FIG. 2 is an exploded view of the five components of the pocket of FIG. 1;

FIG. 2A is a fragmentary cross sectional view taken substantially along line 2A—2A of FIG. 2 and numerically designating the various surfaces and parts of the components of the five-piece pocket for ease of explanation;

DESCRIPTION OF THE PREFERRED EMBODIMENTS

Figure 3:
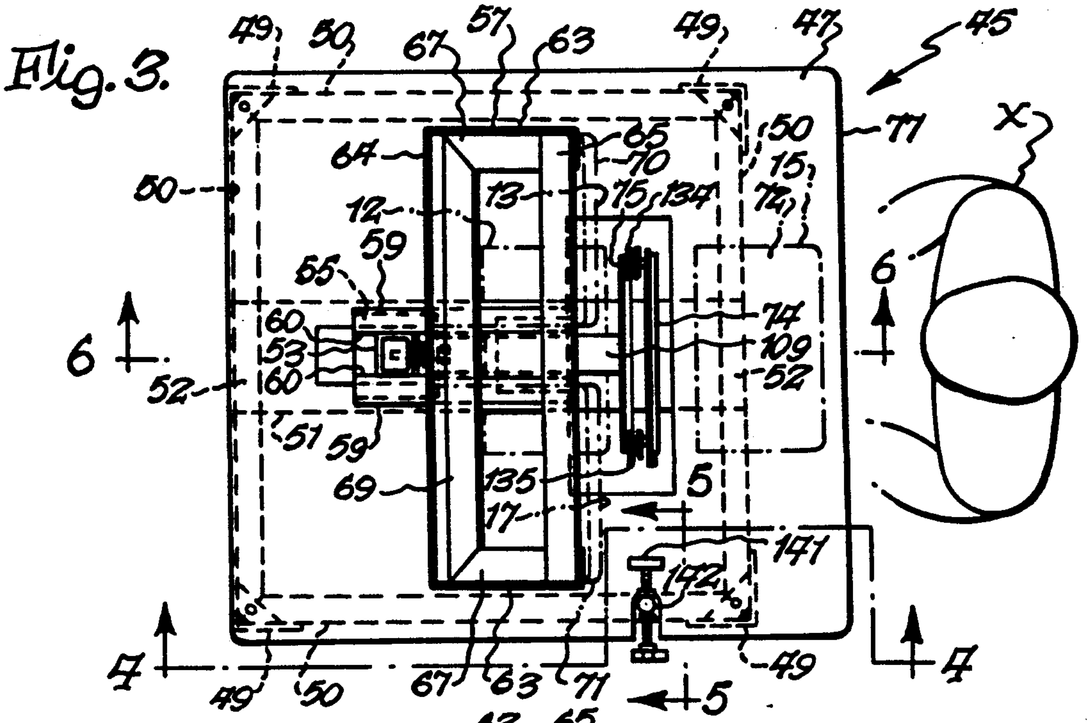
FIG. 3 is a plan view of the fixture for assembling the pocket with the locating plates in a normally open position.

Five-piece expanding pockets are well known. However, the five-piece expanding pocket 10 of the present invention is structurally different from prior pockets and is fabricated by a novel method and by the use of a fixture which enables blind personnel to assemble it.

The five-piece expanding pocket 10 structurally includes a front panel 11 consisting of a front outer panel 12 and a front inner panel 13. It also includes a rear panel 14 consisting of a rear outer panel 15 and a rear inner panel 17.

Panels 12, 13, 15 and 17 are cut to size before they are assembled. Pocket 10 also includes a gusset 19 having a central portion 20 and two end portions 21. The gusset 19 is accordian-pleated and it is folded along lines 22, 23 and 24 (FIGS. 2, 8 and 12) which extend throughout the entire length of the gusset including central portion 20 and outer end portions 21. The outer edges 25 and 27 of central portion 20 have cohesive glue on both opposite sides thereof. The outer edge portions 29 and 30 of outer end portions 21 have cohesive glue on both opposite sides thereof. Gusset 19 is cut away at the four junctions 31 between central portion 19 and end portions 21 (FIG. 12) so that when end portions 21 are folded upwardly to the position of FIG. 2 from the position of FIG. 12, there will be four mitered corners at 32 because the folding is effected along straight fold lines 33 which extend all the way between cutouts 31 and along zigzag lines 34 which permit the accordian pleating of gusset 19. Fold lines 33 and zigzag lines 34 are scored or embossed into the gusset so that folding will occur along these lines, as explained in greater detail hereafter.

Figure 13:
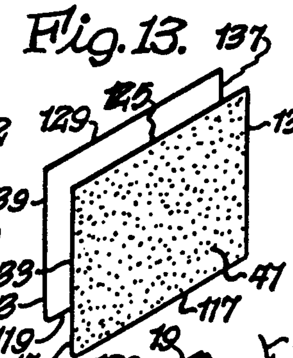
FIG. 13 is a schematic view showing the manner in which the inner front and rear panels of the pocket are positioned on the fixture.
Figure 14:
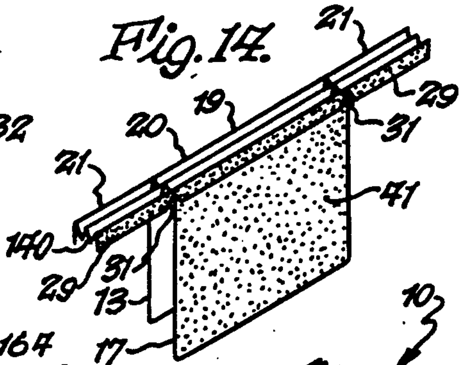
FIG. 14 is a schematic view showing the step of assembling the central portion of the gusset with the front and rear inner panels when they are in a position wherein the locating plates are in a closed position.
Figure 15:
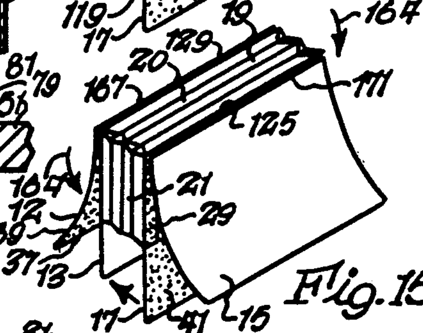
FIG. 15 is a schematic view showing the front and rear outer panels being assembled with the subassembly of the inner panels and the gusset when the locating plates are in an open position.
Figure 16:
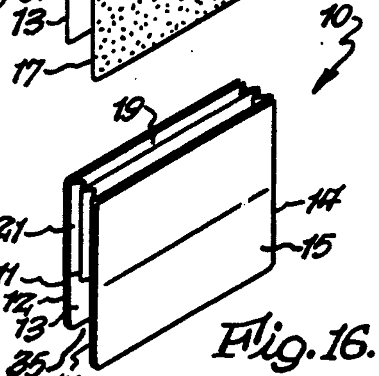
FIG. 16 is a perspective view of the completely assembled pocket.

As can be seen from FIGS. 1 and 2A, front panel 11 is of lesser height than rear panel 14. In FIG. 1 front panel 11 is in front of rear panel 14, and the pocket is shown in an upright position with the opening 35 at the top. However, in FIG. 16 the opening 35 is at the bottom, and the rear panel 14 is in front of front panel 11. FIGS. 13–15 show the various parts of pocket 10 in the same orientation in which they exist in FIG. 16. In the following discussion, the various surfaces of panels 12, 13, 15 and 17 will be designated "inner" and "outer" with reference to the direction they face relative to opening 35 of the assembled pocket 10. For ease of explanation, the various surfaces are numerically designated relative to each other in FIG. 2A. Thus, outer panels 12 and 15 have inner surface 37 (FIG. 15) and inner surface 39 (FIG. 2), respectively, which face opening 35. Inner panels 13 and 17 have outer surface 40 (FIG. 2) and outer surface 41 (FIG. 14), respectively, which face away from opening 35. Cohesive glue entirely covers surfaces 37, 39, 40 and 41.

As can be seen from FIG. 2A, the inner surface 39 of rear outer panel 15 faces the outer surface 41 of rear inner panel 17, and the inner surface 37 of front outer panel 12 faces the outer surface 40 of front inner panel 13, and since these surfaces have cohesive glue thereon, they adhere to each other when they are pressed together. As is well known, cohesive glue on an object will only stick to other objects which have cohesive glue thereon. Thus, the sides of the various panels which have cohesive glue thereon will not stick to other objects unless such objects have cohesive glue thereon.

When the five-piece pocket 10 is assembled as shown in FIG. 1, the opposite edges 25 and 27 of central portion 20 of gusset 19, which have cohesive glue on the opposite sides thereof, are located between the front and rear inner and outer panels as shown in FIG. 2A, and the edge portions 29 and 30 of gusset ends 21 are also positioned between the front and rear inner and outer panels, and since all contacting surfaces between the inner and outer front and rear panels and the edge portions 25, 27, 29 and 30 of the gusset have cohesive glue thereon, the gusset will be caused to remain glued in assembled relationship with the front and rear inner and outer panels as shown in FIG. 1. Furthermore, as briefly noted above, the front outer and inner panels 12 and 13 will adhere to each other because of the cohesive glue on their facing surfaces, and the rear outer and inner panels 15 and 17 will also adhere to each other because of the cohesive glue on their facing surfaces.

Figure 4:
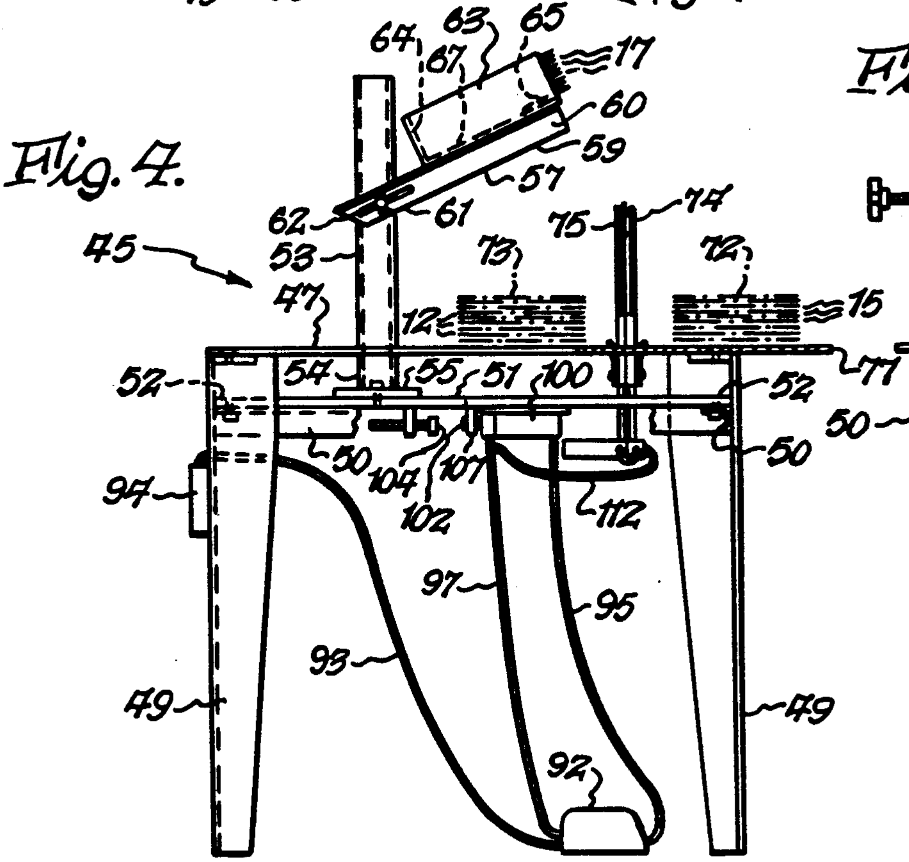
FIG. 4 is a cross sectional view taken substantially along line 4—4 of FIG. 3 with the locating plates in a closed position.
Figure 5:
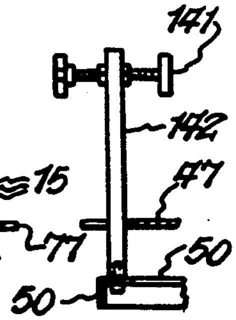
FIG. 5 is a fragmentary cross sectional view taken substantially along line 5—5 of FIG. 3.

The use of the cohesive glue on the various above-described surfaces of the pocket 10 permits it to be assembled by blind personnel on the fixture 45 described in FIGS. 3–11. Fixture 45 includes a table top 47 supported by four legs 49 which are suitably secured to the square formed by four angles 50. A beam 51 has its opposite ends 52 suitably secured at the midpoints of two opposed angles 50 (FIG. 3). A columnar standard 53 has its lowermost portion 54 secured, as by welding, to plate 55 which is bolted to beam 51. A rack 57 includes a beam 59 having spaced sides, such as 60, which straddle standard 53, and wing nuts 61 fit through slots 62 in sides 60 and secure beam 59 in the desired inclination and height relative to standard 53. Rack 57 also includes spaced opposed sides 63 which are connected at their ends by a rear side 64. The bottom of rack 57 consists of a plurality of slats 65, 67 and 69 which are oriented in the shape of a planar rectangle. The purpose of rack 57 is to hold spaced stacks of front and rear inner panels 13 and 17, as shown in FIGS. 3 and 4. Front inner panels 13 are placed in a stack 70 and rear inner panels 17 are placed in a stack 71. The rear inner panels 17 are oriented with their cohesive glue surfaces 41 facing downwardly in stack 71, and the front inner panels 13 are oriented in stack 70 with their cohesive glue surfaces 40 facing upwardly. In addition, the rear outer panels 15 are placed in a stack 72 (FIG. 4) on the table with their cohesive glue surfaces 39 facing downwardly, and the front outer panels 12 are placed in a stack 73 with their cohesive glue surfaces facing downwardly.

The heart of the fixture 45 resides in fixed locating plate 74 and movable locating plate 75 which is normally spaced from plate 74 (FIGS. 3 and 9) when the fixture is not being actuated and which is located next to plate 74 (FIGS. 4, 8 and 10) when the fixture is actuated. In assembling the five-piece pocket 10, an operator X sits at the side 77 of the table facing toward fixed locating plate 74 with the stack 72 of panels 15 directly in front of him. At this time, as noted above, locating plates 74 and 75 are apart (FIG. 3). Fixed locating plate 74 includes a base 79 (FIG. 6) which is affixed to beam 51 and a conduit 80 passes through beam 51, and is in communication with internal conduit 81 in body 79 of plate 74. Conduit 81 is in communication with conduit 82 (FIGS. 7 and 10) in body 79, which in turn is in communication with conduit 83 which in turn is in communication with conduits 84 at the opposite ends thereof. Conduit 82 is covered by permeable membrane 85 which lies flush with the outer surface 90 of locating plate 74. Thus, when vacuum is applied to conduit 82 from conduit 81, a suction force will be experienced at the surface of permeable membrane 85 and at conduits 83 and 84 which are uncovered at the face of the outer surface 90. Movable locating plate 75 has analogous conduits associated therewith for creating suction forces at the plate surface 90′. More specifically, a conduit 80′ extends through beam 51 and is in communication with conduit 81′ in body 79′ of locating plate 75. Conduit 81′ in locating plate body 79′ is in communication with conduit 82′ (FIGS. 7 and 10), which is analogous to conduit 82. Conduit 82′ is in communication with conduit 83′ which is in communication with conduits 84′. Conduits 83′ and 84′ are located in locating plate body 79′ and are analogous to conduits 83 and 84, respectively, in locating plate body 74. Conduit 82′ is covered with a permeable membrane which is analogous to permeable membrane 85 of locating plate 74. When vacuum is applied to conduit 80′, a suction will be created at the surface 90′ of locating plate 75 by permeable membrane and by conduits 83′ and 84′ which are open at the surface of plate 90′.

Figures 6, 7, 8, 9:
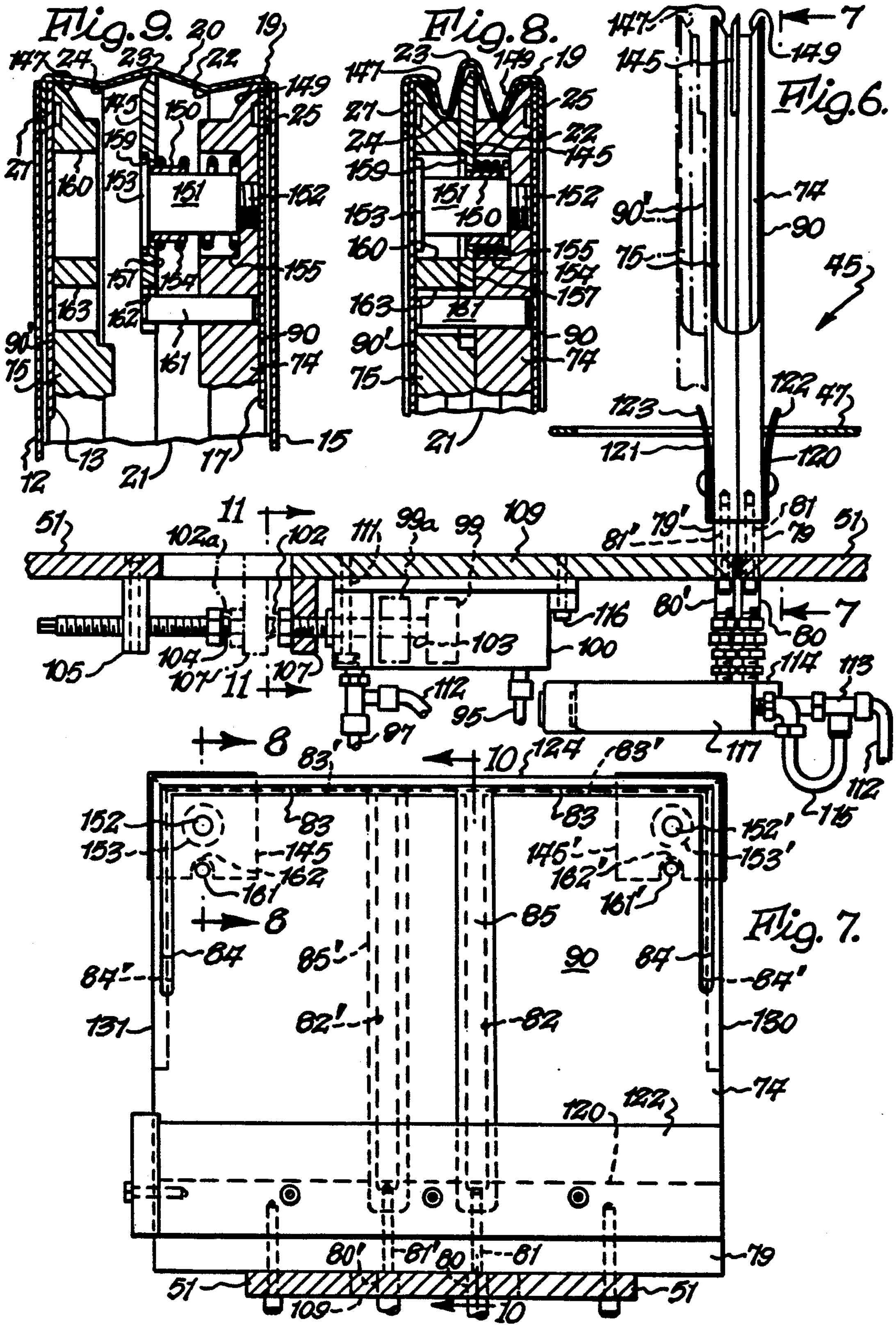
FIG. 6 is a fragmentary enlarged cross sectional view taken substantially along line 6—6 of FIG. 3 but with the locating plates in a closed position and the structure which actuates them in a corresponding position.
FIG. 7 is a cross sectional view taken substantially along line 7—7 of FIG. 6.
FIG. 8 is a fragmentary enlarged cross sectional view taken substantially along line 8—8 of FIG. 7 and showing more details of the locating plates and associated structure and also showing the gusset secured to the front and rear inner panels of the pocket.
FIG. 9 is a view similar to FIG. 8 but showing the gusset and the various panels positioned on the locating plates with the latter in an open position.
Figure 10:
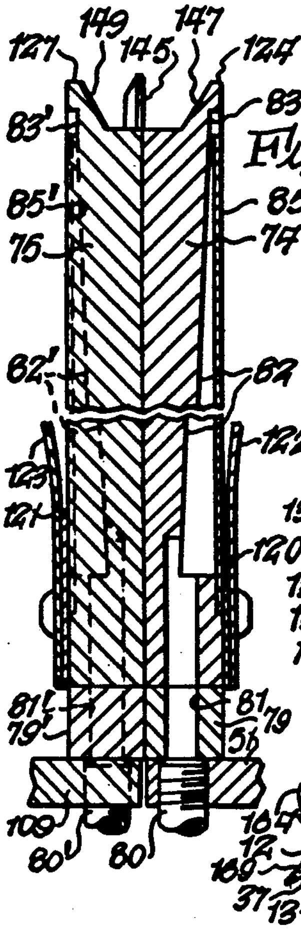
FIG. 10 is a fragmentary cross sectional view taken substantially along line 10—10 of FIG. 7 and showing the vacuum conduits with the locating plates and the bottom stops for the front and rear inner panels.
Figure 11:
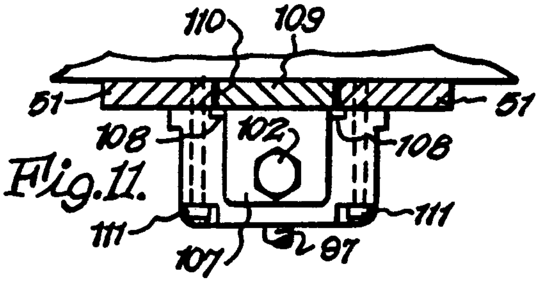
FIG. 11 is a fragmentary cross sectional view taken substantially along line 11—11 of FIG. 6 and showing the slide structure for the movable locating plate.

As noted above, when the fixture 45 is in its normal non-actuated position, movable locating plate 75 is spaced from stationary locating plate 74, as shown in solid lines in FIG. 3 and as shown in dotted lines in FIG. 6. In order to actuate the fixture 45, a foot pedal valve 92 (FIG. 4) is supplied for actuation by the fixture operator X who occupies the position shown in FIG. 3. A compressed air conduit 93 has one end in communication with a source of compressed air 94 and its other end in communication with foot pedal valve 92. Normally valve 92, when not actuated, supplies compressed air to chamber 101 of cylinder 100 while permitting conduit 95 leading therefrom to be vented. When this is the case, piston 99 in cylinder 100 will be moved to its dotted line position 99*a*, and this will cause the outer end 102 of piston rod 103 to move to its dotted line position 102*a* wherein it abuts stop 104 screwed into nut member 105 affixed to beam 51. Piston rod 103 is threaded into flange 107 (FIGS. 6 and 11) which depends downwardly from slide member 109 (FIG. 11) which rests on flanges 108 and is guided for sliding movement within channel 110 in beam 51. Cylinder 100 is attached to beam 51 by screws 111 and 116.

When foot pedal valve 92 is actuated by operator X, compressed air is supplied to conduit 97 and conduit 95 is vented. The compressed air which is supplied to conduit 97 will move piston 99 from its dotted line position 99*a* (FIG. 6) to the right and thus move slide 109 to the position shown in FIG. 6 wherein locating plate 75 moves to its solid line position from its dotted line position. At the same time the compressed air in conduit 97 will be communicated to conduit 112. The compressed air in conduit 112 is communicated to T 113 which is in communication with aspirator 114 which causes a vacuum to be created in conduit 80 with which it is in communication to thus supply suction to conduits 82, 83 and 84 and thus apply suction to face 90 of locating plate 74. Simultaneously, the vacuum in T 113 will be communicated to conduit 115 which is in communication with aspirator 117 which is in communication with conduit 81′ to thus supply vacuum to conduits 82′, 83′ and 84′ in locating plate 75 to thus apply suction to the face 90′ thereof. Aspirator 114 is of the same configuration as housing 117 but is shown in FIG. 6 as being located directly behind it.

When cylinder 100 is thus actuated, locating plate bodies 79 and 79′ will be placed in contiguous adjacent positions, such as shown in FIGS. 4, 6, 8 and 10. At this time the operator reaches up with his left hand and takes an inner rear panel 17 from rack 57 and places it against the face 90 of locating plate 74 with its cohesive glue coated face 41 facing him. Simultaneously, he takes a front inner panel 13 from rack 57 with his right hand and places it against face 90′ of locating plate 75 with its cohesively located face 40 facing away from him. The foregoing is schematically shown in FIG. 13. The faces 90 and 90′ of locating plates 74 and 75, respectively, are exactly the same size as inner panels 17 and 13, respectively, and the edges 117 and 119 (FIG. 13) of panels 17 and 13, respectively, rest on the edges of stops 120 and 121 (FIGS. 10 and 7), respectively, of locating plates 74 and 75, respectively. The lower edges 117 and 119 are guided into position to abut stops 120 and 121, respectively, by guide plates 122 and 123, respectively. The edges of stops 120 and 121 extend entirely across plates 74 and 75, respectively (FIG. 7). Stated otherwise, the dimension of the face 90 of locating plate 74 between the edge of stop 120 and upper edge 124 is the same dimension as inner rear panel 17 between edge 117 and edge 125 (FIG. 13). Furthermore, the dimension between edge 121 and upper edge 127 of locating plate 75 is the same as the distance between edges 119 and 129 of inner panel 13. Furthermore, the distance between the side edges 130 and 131 of the face 90 of locating plate 74 is the same distance as between edges 132 and 133 of panel 17 (FIG. 13). The distance between the side edges 134 and 135 (FIG. 3) of the face 90′ of locating plate 75 is the same as the distance between edges 137 and 139 of front inner panel 13 (FIG. 13). Thus, the blind operator X places inner panels 17 and 13 against the faces 90 and 90′, respectively, of locating plates 74 and 75, respectively, and by touch orients them in exact overlying position to locating plate faces 90 and 90′, respectively, by virtue of the coincidence of the above-described matching measurements. The suction which is created at the faces 90 and 90′ of the locating plates will hold inner panels 17 and 13 in position.

The next step is for the operator to grasp a gusset 19 from a pile (not shown) at his side. Gusset 19 (FIG. 14) is slightly creased to the condition shown in FIG. 14. As noted from FIG. 12, gusset 19 is symmetrical about a vertical centerline, and thus each end portion 21 is also symmetrical about the centerline. The operator, by feel, then holds gusset 19 above locating plates 74 and 75 with the central portion 20 generally parallel to the upper edges 124 and 127 of the locating plates. He then moves gusset 19 downwardly in FIG. 3, which is the same as moving it to the left when he is facing the table 47. This movement is continued until the extreme left end 140 of gusset 19 (FIG. 14) abuts stop 141 (FIGS. 3 and 5) which is adjustably mounted on standard 142 extending upwardly from table angle 50. When end 140 abuts locating stop 141, the central portion 20 of gusset 19 will be in exact alignment with front panels 13 and 17 (FIG. 14). The operator then manually presses both cohesive glue coated edge portions 25 and 27 against cohesive glue coated surfaces 41 and 40 of panels 17 and 13, respectively. Since the contacting surfaces of edge portions 25 and 27 and surfaces 41 and 40 are all coated with cohesive glue, the act of pressing these surfaces together will cause them to adhere to each other so that the subassembly of FIG. 14 is obtained.

Corner support plates 145 and 145' provide support for the outer ends of center crease 23 of the gusset, when locating plates 74 and 75 are both together and apart. Corner plates 145 and 145' and their associated structures are identical, and thus only plate 145 and its associated structure will be described, and it will be understood that plate 145' has analogous structure. Thus, as can be seen from FIG. 8, when locating plates 74 and 75 are together, plates 145 and 145' will essentially underlie central crease 23. Furthermore, because of the contours of locating plates 74 and 75 at surfaces 147 and 149 (FIG. 8), respectively, the central portion 20 of gusset 19 can be manipulated to the cross sectional contour shown in FIG. 8 wherein creases 22 and 24 are bent in, if necessary, as shown in FIG. 8.

After the foregoing has been achieved, the foot pedal valve 92 is released so that conduit 97 will be vented and conduit 95 will supply compressed air to cylinder 100 to cause it to move to the dotted line position of FIG. 6 wherein plates 74 and 75 are apart. At this time, locating plates 145 and 145' will still remain at an exact centered position between locating plates 74 and 75. In this respect, locating plate 145 has a central tubular portion 150 secured to the central portion thereof which slides on cylindrical stem 151 affixed by threaded portion 152 to locating plate 74. A stop collar 153 is affixed to the end of stem 151 and it acts as a stop for plate 145 when the latter is biased to the left by spring 154 from the position of FIG. 8 to the position of FIG. 9. In this respect, spring 154 is located between shoulder 155 of locating plate 74 and surface 157 of plate 145. The limit of movement of plate 145 from its position of FIG. 8 to its position of FIG. 9 is determined when flange 159 abuts collar 153 (FIG. 9). When the parts are in the position of FIG. 8, the left end of stem 151, including collar 153, are received in recess 160 of locating plate 75. To guide plate 145, a pin 161 is mounted in locating plate 74 and it extends through an aperture 162 in locating plate 145. When locating plates 74 and 75 are in the position of FIG. 8, the end of pin 161 is received in recess 163. As noted above, locating plate 145' has identical structure.

Figure 12:
FIG. 12 is a plan view of the gusset which has been cut, creased and scored.

After the locating plates 74 and 75 move apart, the corner plates 145 are in the orientation shown in FIG. 9. At this time the operator bends both outer end portions 21 of the gusset 19 in the direction of arrows 164 from the position of FIG. 14 to the position of FIG. 15. In this respect, both outer end portions 21 are bent downwardly simultaneously using one hand on each end portion. The corner plates 145 provide support for the outer end portions of central portion 20 of gusset 19 and the gusset is thus folded about embossed crease lines 33 (FIG. 12). The fact that the locating plates 74 and 75 are apart facilitates the bending. As noted above, the opposite sides of outer edge portions 29 and 30 of gusset ends 21 are coated on both sides with cohesive glue. They are then pressed against the cohesive glue surfaces 40 and 41 of inner panels 17 and 13, respectively, so that they occupy the assembled position schematically shown in FIG. 15 with the inner panels.

After the edges 29 and 30 of the end portions of the gusset are pressed into bonded relationship with the front and rear inner panels, cylinder 100 is again actuated to move locating plate 75 into its closed position. This results in automatically forming the accordian-pleating along embossed or scored zigzag lines 34, without requiring this to be done manually. Furthermore, when locating plates 74 and 75 are together, suction is applied at faces 90 and 90', respectively, to apply an additional holding force to firmly hold the inner panels 13 and 17 in position, even though they are already held in position by the gusset which is bonded thereto in the above manner.

After the subassembly of the inner panels 13, 17 and gusset 19 has been completed and while locating plates 74 and 75 are together, the operator lifts a front outer panel 12 from pile 73, and aligns its edge 167 (FIGS. 2, 2A and 15) with edge 129 of inner front panel 13 and also aligns the side edges 169 and 170 of outer front panel 12 with the corresponding edges of inner front panel 13. After this alignment has been effected, the cohesive glue surfaces 37 and 40 of panels 12 and 13 are pressed together to cause them to adhere to each other with the edge portions 29 and 30 of the gusset therebetween. The same procedure is followed with outer rear panel 15 by aligning its bottom edge 171 with edge 125 of inner panel 17 and with the cohesive glue surfaces facing each other with edge portions 29 of the gusset therebetween. The cohesive glue surfaces are pressed together to thus provide the completed five-piece expanding pocket assembly shown in FIGS. 1 and 16. After the foregoing assembly has been completed, the assembled pocket 10 is lifted upwardly off of locating plates 74 and 75 after they have been moved to their apart position wherein suction is no longer being applied to their faces.

Thereafter, the pocket 10 is heated to reactivate the cohesive glue and it is thereafter passed through a pair of rollers for firmly pressing all glued parts together to complete the assembly.

Figure 17:
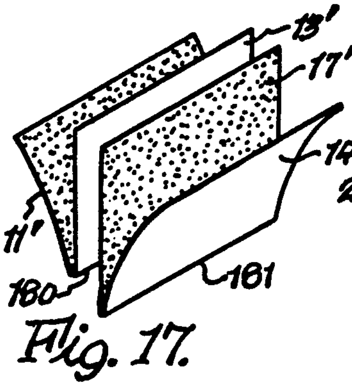
FIG. 17 is a perspective view of an alternate embodiment of the five-piece pocket wherein the front inner and outer panels are continuous sheets and the rear inner and outer panels are also continuous sheets.
Figure 18:
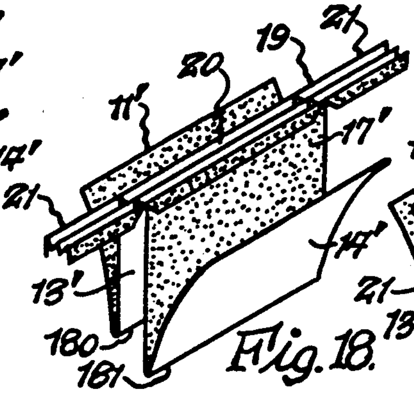
FIG. 18 is a schematic perspective view showing the central portion of the gusset being secured to the inner front and rear panel portions of the front and rear panels of FIG. 17.
Figure 19:
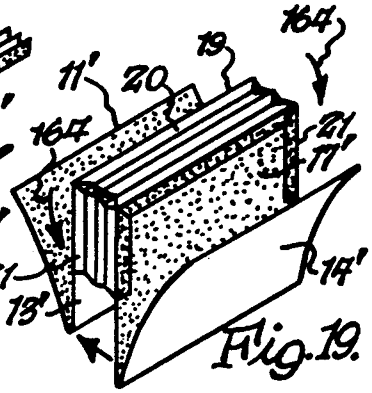
FIG. 19 is a schematic perspective view of the final step in assembling the pocket consisting of the parts shown in FIGS. 17 and 18.

In FIGS. 17-19 an alternate five-piece pocket assembly construction is disclosed. In this assembly the gusset 19 is identical to gusset 19 described above. However, the front side 11', and the rear side 14', which correspond to front and rear sides 11 and 14 of FIG. 1 are composed of single pieces of cohesively glue coated paper which are folded at fold lines 180 and 181, respectively. However, the assembly method is the same. The inner panels 13' and 17' are aligned on the locating plates 75 and 74, respectively, as described above. The gusset 19 is then attached to panels 13' and 17' as described above. Thereafter, the outer panels 11' and 14' are pressed into position to complete the assembly. The advantage of the method of FIGS. 17-19 over that of the preceding figures is that the edges of the front, inner and outer panels are in exact alignment and the edges of the rear inner and outer panels are in exact alignment because the alignment is determined by the fold lines 180 and 81. Thus, once the inner panels 13' and 17' are properly aligned on the locating plates with fold lines 180 and 181 against the edges of stops 121 and 120, respectively, there is no need to align the outer panels 11' and 14' because they will become automatically aligned.

It can thus be seen that the improved five-piece expanding pocket, the method of fabrication thereof and the fixture are manifestly capable of achieving the above-enumerated objects, and while preferred embodiments of the present invention have been disclosed, it will be appreciated that it is not limited thereto but may be otherwise embodied within the scope of the following claims.

What is claimed is:

1. A fixture for assembling a five-piece pocket comprising a base, first support means on said base for supporting a stack of front inner panels, second support means on said base for supporting a stack of rear inner panels, third support means on said base for supporting a stack of front outer panels, fourth support means on said base for supporting a stack of rear outer panels, a first locating plate mounted on said base for positioning a front inner panel and a front outer panel thereon, a second locating plate mounted on said base for positioning a rear inner panel and a rear outer panel thereon, moving means on said base for moving said first and second locating plates together and apart, and gusset-locating means on said base for locating a gusset relative to said first and second locating plates.

2. A fixture as set forth in claim 1 wherein said first locating plate is stationary, and wherein said second locating plate is movable relative thereto, and wherein said moving means comprises a motor.

3. A fixture as set forth in claim 1 wherein said moving means comprises a motor, and wherein said gusset locating means comprises a stop for being contacted by the end of a gusset.

4. A fixture as set forth in claim 1 wherein said gusset has a central portion and outer end portions on opposite ends thereof, and support means between said first and second locating plates for supporting said central portion of said gusset proximate said outer ends thereof.

5. A fixture as set forth in claim 4 including means for positioning said support means substantially midway between said first and second locating means both when they are together and fully apart.

6. A fixture for manually assembling a five-piece expanding pocket consisting of a front inner panel having a first lower edge portion and first side edge portions and a first outer surface with cohesive glue thereon, and a front outer panel having a second lower edge portion and second side edge portions and a first inner surface with cohesive glue thereon with said first inner and outer surfaces secured to each other and with all of said first and second edge portions in alignment, said five-piece expanding pocket also consisting of a rear inner panel having a third lower edge portion and third side edge portions and a second outer surface with cohesive glue thereon, and a rear outer panel having a fourth lower edge portion and fourth side edge portions and a second inner surface with cohesive glue thereon with said second inner and outer surfaces secured to each other and with all of said third and fourth edge portions in alignment, said five-piece expanding pocket also consisting of an accordian pleated gusset having a central portion with first gusset edge portions and also having opposite outer end portions with second gusset edge portions, cohesive glue on inner and outer opposite sides of said first and second gusset edge portions which are located between said front and rear inner and outer panels, said fixture comprising a base, a first locating plate having portions dimensioned substantially the same as said front inner and outer panels, a second locating plate having portions dimensioned substantially the same as said rear inner and outer panels, means mounting said first and second plates in aligned relationship on said base, first locating means on said first locating plate for locating said front inner panel in a first predetermined position thereon, first retaining means on said first plate for retaining said front inner panel in said first predetermined position with said first outer surface facing away therefrom, second locating means on said second locating plate for locating said rear inner panel in a second predetermined position thereon in alignment with said front inner panel, second retaining means on said second plate for retaining said rear inner panel in said second predetermined position with said second outer surface facing away therefrom, third locating means on said base for locating said gusset with said central portion in alignment with said first and third lower edge portions and with said inner sides of said first gusset edge portions located in contiguous relationship to said first and third lower edge portions, said first and second locating means also locating said inner sides of said second gusset edge portions in contiguous relationship with said first and third side edge portions, and said first and second locating means also locating said front and rear outer panels, respectively, in alignment with said front and rear inner panels, respectively, and in overlying relationship to said outer sides of said first and second gusset edge portions which have been secured to said first and third lower edge portions and said first and third side edge portions.

7. A fixture as set forth in claim 6 wherein said third locating means comprises a stop member located laterally of said first and second plates for engagement by the extreme outer end of one of said end portions of said gusset.

8. A fixture as set forth in claim 7 wherein said first and second retaining means comprise suction ducts in said first and second plates, respectively.

9. A fixture as set forth in claim 6 including means for selectively moving said first and second plates toward each other from an open position to a closed position.

10. A fixture as set forth in claim 9 including means located between said first and second plates for supporting outer ends of said central portion of said gusset both when said first and second plates are in said open position and when they are in said closed position.

11. A fixture as set forth in claim 6 wherein said front inner panel includes a first upper edge portion, and wherein said portions of said first plate which are dimensioned substantially the same as said front inner and outer panels comprise first plate side edges which are spaced the same distance apart as said first and second side edge portions of said front outer and front inner panels, respectively, a stop abutment located relative to said first plate, and an edge on said first plate located a distance from said stop abutment which is the same as the distance between said second lower edge portion and said first upper edge portion.

12. A fixture as set forth in claim 11 wherein said rear inner panel includes a second upper edge portion, and wherein said portions of said second plate which are dimensioned substantially the same as said rear inner and outer panels comprise second plate side edges which are spaced the same distance apart as said third and fourth side edge portions of said rear inner and outer panels, respectively, a second stop abutment located relative to said second plate, and a second edge on said second plate located a distance from said stop abutment which is the same as the distance between said fourth lower edge portion and said second upper edge portion.

13. A fixture as set forth in claim 12 wherein said third locating means comprises a stop member located laterally of said first and second plates for engagement by the extreme outer end of one of said end portions of said gusset.

14. A fixture as set forth in claim 13 wherein said first and second retaining means comprise suction ducts in said first and second plates, respectively.

15. A fixture as set forth in claim 14 including means for selectively moving said first and second plates toward each other from an open position to a closed position.

16. A fixture as set forth in claim 15 including means located between said first and second plates for supporting the outer ends of said central portion of said gusset both when said first and second plates are in said open position and when they are in said closed position.

17. A fixture for assembling a five-piece pocket comprising a base, a first locating plate fixedly mounted on said base, means on said first locating plate for positioning a pocket front inner panel relative thereto, means on said first locating plate for holding said pocket front inner panel thereon, a second locating plate on said base positioned in alignment with said first locating plate for positioning a pocket rear inner panel relative thereto, means on said second locating plate for holding said pocket rear inner panel thereon, means on said base for moving said first and second locating panels together and apart, means on said base for aligning the central portion of a gusset with said first and second locating plates and said front and rear inner panels held thereon when said first and second locating panels are together, said gusset also having outer end portions on opposite ends of said central portion, means for supporting said central portion of said gusset when said first and second locating plates are apart for permitting said outer end portions of said gusset to be bent relative to said central portion along straight scored lines between said central portion and said outer end portions, said gusset also having zigzag scored lines between said central portion and said outer end portions for automatically producing pleated corners therebetween incidental to the movement of said first and second locating plates toward each other after said outer end portions of said gusset were bent relative to said central portion thereof.

* * * * *